March 12, 1929.  O. B. SCHELLBERG  1,704,764
COLONIC EXPLORATION APPARATUS
Filed July 8, 1926
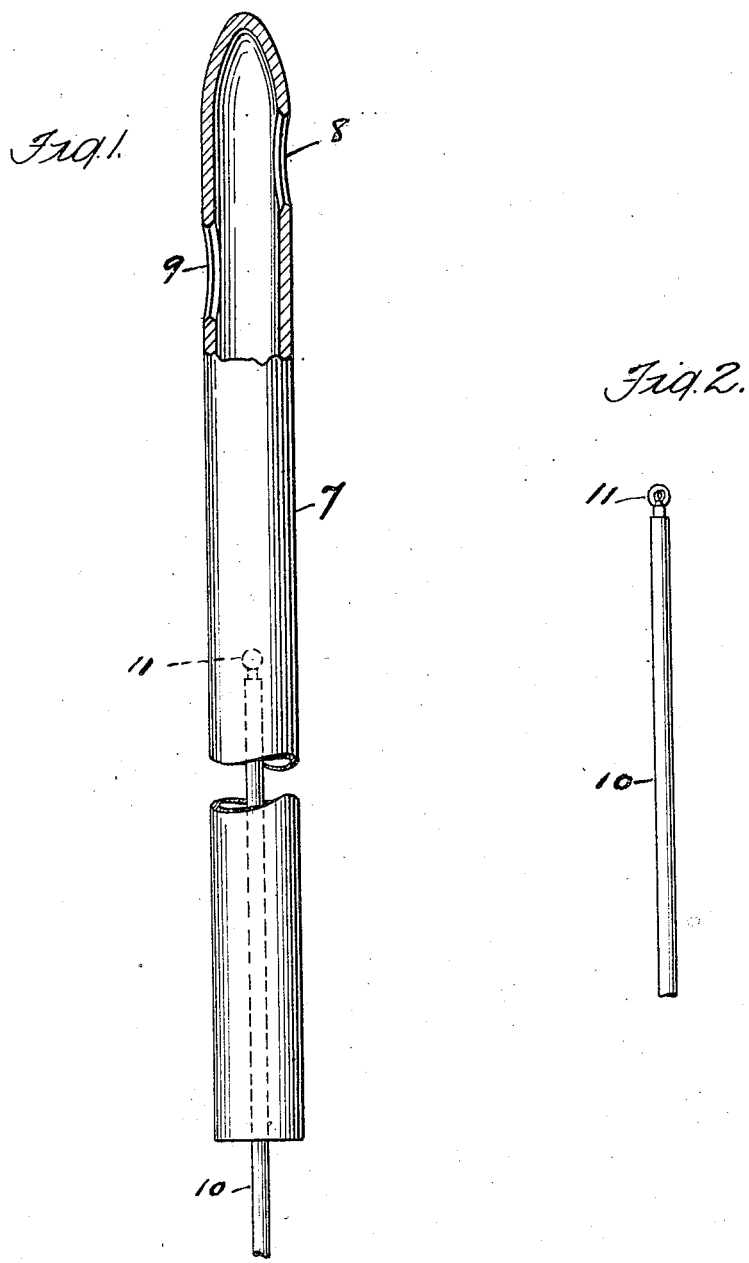
INVENTOR
OSCAR BOTO SCHELLBERG
ATTORNEY Patented Mar. 12, 1929.

1,704,764

UNITED STATES PATENT OFFICE.

OSCAR BOTO SCHELLBERG, OF NEW YORK, N. Y.

COLONIC-EXPLORATION APPARATUS.

Application filed July 8, 1926. Serial No. 121,116.

Among the principal objects which the present invention has in view are: to provide means for introducing an illuminating element within the colon of a human being; to provide an apparatus embodying a translucent flexible tube with means for introducing the same within said colon, and flexible means for extending the illuminating member within the said tube.

Figure 1 is a side view of a tube such as characterized, the same being partly in section to show the interior construction thereof, with an electric cable and illuminating member supported thereby, said member and cable being shown by broken lines.

Figure 2 is a side view of a fragment of said cable and illuminating member mounted thereon.

The tube 7 shown in the drawings is preferably manufactured from a substantially transparent rubber compound which is sufficiently flexible to permit the tube 7 to follow the sinuous folds and disposition of the colons and tributary intestines. Adjacent the terminus are apertures 8 and 9 disposed as shown in the drawings in staggered relation, thereby rendering the introductory end of the tube exceedingly flexible to pilot the remainder of the tube through the colonic and intestinal passages. A similar tube, though opaque, together with the method of introducing the same is disclosed in the patent granted to me August 8, 1922, and reissued under date of January 12, 1926, bearing the Reissue No. 16,251, for improvements in "medical apparatus for use in procto-therapy".

Having introduced the tube 7, as in service, a flexible cable 10 having disposed at the terminus thereof a small illuminating electric lamp 11 is extended lengthwise of the tube 7. When current is supplied to the lamp 11 to illuminate the same, the light thus produced illumines the colons and intestines, the light penetrating to the walls of the colons and intestines through the tube 7. This light has been found to be sufficiently powerful to permit of taking, under favorable conditions, photographs of the areas illumined thereby.

Claim:

In an apparatus as characterized a flexible translucent rubber tube adapted to be introduced into and through the colon of the human body to the cecum, and to thereafter receive and form a passageway for an illuminating device.

OSCAR BOTO SCHELLBERG.